United States Patent

[11] 3,548,699

| [72] | Inventors | Heinz Joseph Gerber<br>West Hartford;<br>Robert J. Pavone, Wapping, Conn. |
|---|---|---|
| [21] | Appl. No. | 851,643 |
| [22] | Filed | Aug. 20, 1969<br>Division of Ser. No. 581,065, Sept. 21, 1966,<br>Patent No. 3,477,322. |
| [45] | Patented | Dec. 22, 1970 |

[54] DEVICE FOR CUTTING SHEET MATERIAL
4 Claims, 12 Drawing Figs.

[52] U.S. Cl. .................................................... 83/528;
30/293; 83/561, 83/925; 173/31
[51] Int. Cl. .................................................... B26d 1/04
[50] Field of Search ........................................... 83/527,
528, 530, 248, 561, 562, 925C.C.; 30/273, 272,
275, 293; 173/31

[56] References Cited
UNITED STATES PATENTS

| 245,149 | 8/1881 | Fowler | 30/273X |
|---|---|---|---|
| 2,372,029 | 3/1945 | Stair | 171/31 |
| 3,157,947 | 11/1964 | Oleson | 30/293X |

Primary Examiner—James M. Meister
Attorney—Mc Cormick, Paulding and Huber

ABSTRACT: A cutter head for use with an automatically controlled sheet material cutter utilizes a reciprocating tool having a cutting edge facing the work and located in a plane perpendicular to the axis of reciprocation. The tool and its chuck are rotatable about the axis of reciprocation to allow the cutting edge to be maintained tangent to the line of cut. A presser member engages the work to limit the downward movement of the cutter head and is adjustable relative to the main frame of the head to adjust the maximum amount by which the tool projects beyond the work engaging face of the presser member during its reciprocation.

PATENTED DEC 22 1970

INVENTORS
HEINZ JOSEPH GERBER,
ROBERT J. PAVONE

BY *McCormick, Paulding & Huber*

ATTORNEY

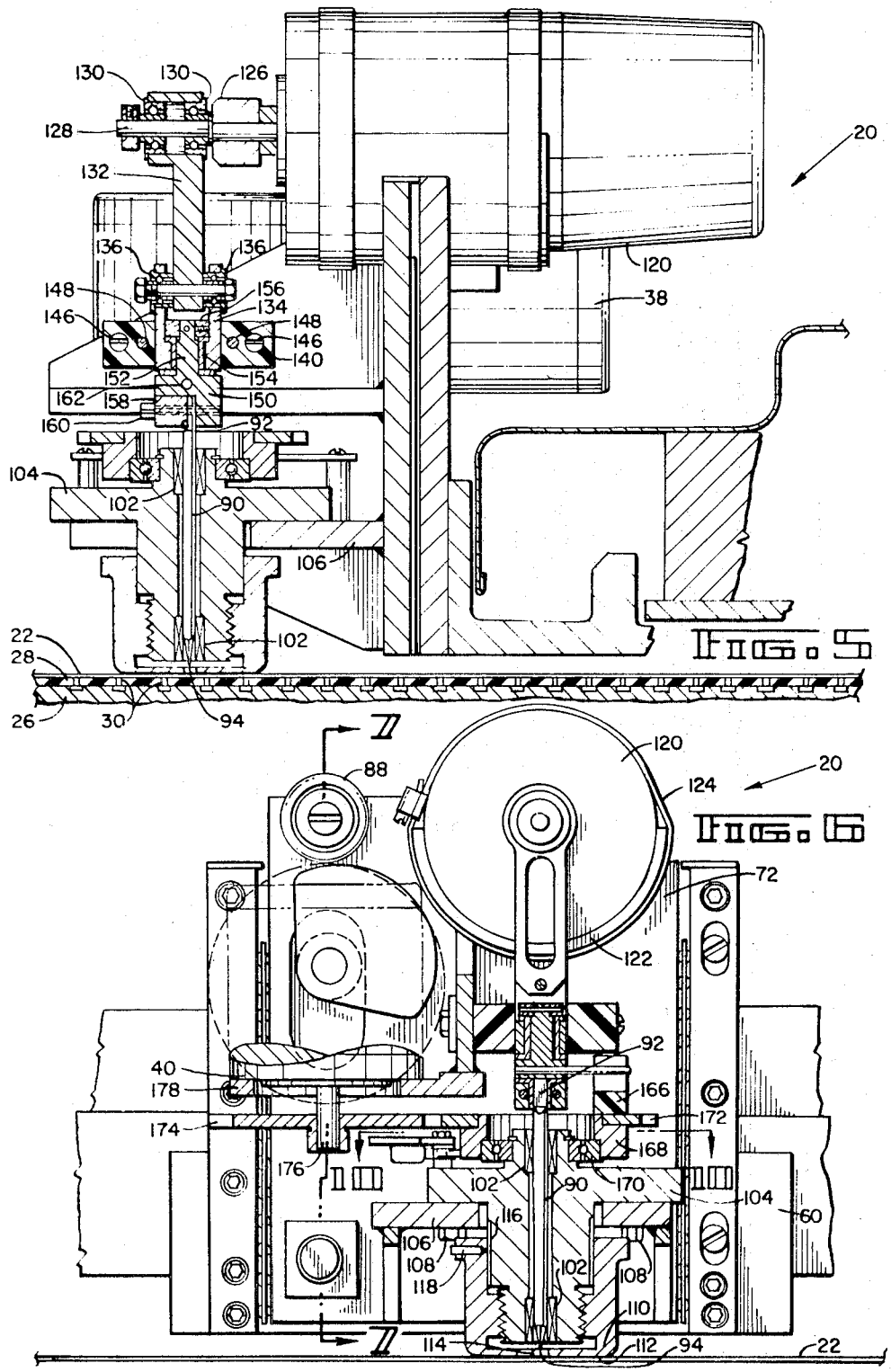

3,548,699

DEVICE FOR CUTTING SHEET MATERIAL

RELATED APPLICATION

This application is a division of copending patent application Ser. No. 581,065, filed Sept. 21, 1966 and entitled "Device For Cutting Sheet Material," now U.S. Pat. No. 3,477,322.

BACKGROUND OF THE INVENTION

This invention relates to devices for cutting sheet material such as paper, cardboard, thin metal or the like to produce parts, patterns or other generally two-dimensional items, and deals more particularly with such a device using a reciprocating cutting tool.

A general object of this invention is to provide a cutting head especially well adapted for attachment to a numerically controlled two-dimensional positioning device or the like, for moving it relative to a piece of sheet material to be cut located on an associated supporting surface.

SUMMARY OF THE INVENTION

The invention resides in a cutter head of a type adapted for attachment to a numerically controlled automatic positioning device or the like for cutting a piece of sheet material located on an associated supporting surface over which the cutter head is movable. Cutting of the workpiece is accomplished by a reciprocating tool having a cutting edge on its lower end. The tool is supported for reciprocation and rotation about its longitudinal axis relative to a main frame and is reciprocated by a chuck in turn driven by a reciprocating drive means to which it is connected for rotation about the axis of reciprocation. A presser member on the frame has a surface generally perpendicular to the axis of tool reciprocation that engages the surface of the work material to limit the movement of the cutter head toward the material. In its reciprocation the cutting edge of the tool normally projects beyond such surface of the presser member and the presser member is vertically adjustable relative to the frame to vary the amount by which the cutting edge of the tool moves beyond such presser member surface during each stroke of its reciprocation. Preferably the presser member is threadably connected with the main frame, surrounds the tool and has a central opening through which the tool projects during its reciprocation.

BRIEF DESCRIPTION OF THE DRAWINGS

FIG. 5 is a vertical sectional view taken on the line 5—5 of FIG. 4.

FIG. 6 is a vertical sectional view taken on the line 6—6 of FIG. 3.

In accordance with this invention, a cutter head is provided having a reciprocating cutting tool adapted to cut a piece of sheet material located generally normal to the axis of tool reciprocation. The cutting tool may take various different forms and could, for example, be a saw blade for sawing the sheet material as it is reciprocated. In this case, the tool has a definite cutting axis which is perpendicular to the face of the material, extending across the thickness thereof, against which the teeth of the blade work. Preferably, however, and as shown in the illustrated embodiment, the cutting tool has a sharp cutting edge which pierces the sheet material as the tool is reciprocated, and in this case the cutting axis is the axis containing the cutting edge. The cutter head is supported for movement in two dimensions over a sheet of material to be cut and means are provided for moving the cutter head so that the axis of the tool reciprocation follows a desired line to be cut on the sheet material. The means for so moving the cutter head preferably includes a numerical controller or computer capable of accepting coded input information and for converting such input information into command signals for causing the cutter head to be moved along the desired line. In cases where the tool has a definite cutting axis, means are also provided for controlling the angular position of the cutting tool relative to the sheet material so that as the tool is moved along a desired line its cutting axis is maintained tangent to the line. The cutting tool may be reciprocated at such a speed in relation to its speed of travel along the desired line as to produce either a continuous cut or to merely perforate the sheet material by a series of spaced cuts or perforations.

Figure 1:
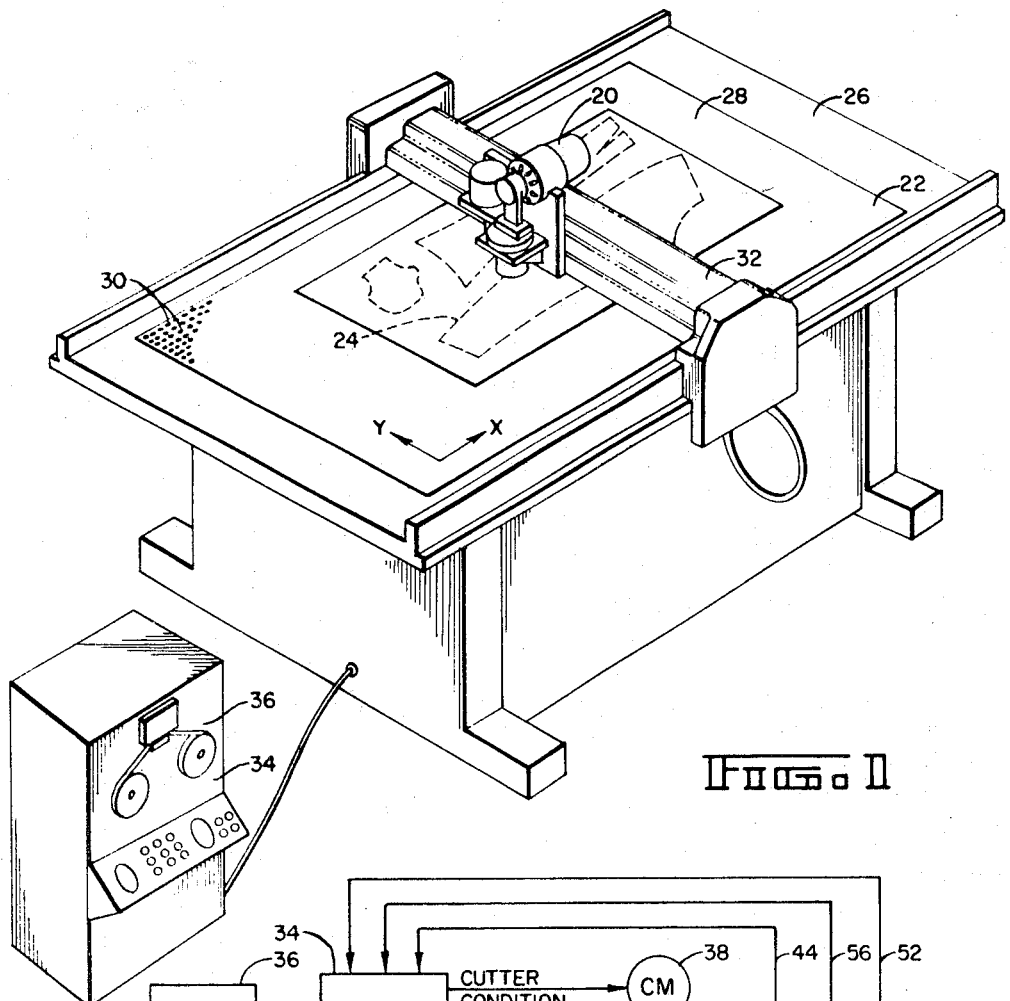
FIG. 1 is a perspective view showing a cutting device utilizing a cutter head embodying the present invention.

Turning to FIG. 1, this FIG. shows a cutting device utilizing a cutter head embodying this invention. In this device, the cutter head is indicated generally at 20 and a sheet of material arranged to be cut by the cutter head is shown at 22. The support for the cutter head 20 and the sheet of material 22 is in this case provided by an X–Y plotter of the type customarily used for drawing or plotting lines or other information on a sheet of paper or the like, the cutter head 20 taking the place of the pen or printing mechanism customarily used on the plotter and the sheet of material 22 taking the place of the paper or similar material normally used with the plotter. The sheet of material 22 may be of various different forms such as, for example, heavy paper, cardboard, plastic sheet, thin sheet metal or gasket material. In FIG. 1, the broken lines 24 on the sheet 22 indicate lines along which it is desired to have the material cut to produce desired articles. These articles may, for example, be patterns later used for cutting other materials such as lay-ups of cloth sheets.

The plotter shown in FIG. 1 is one which is capable of moving the cutter head along a desired line and may take various different forms. For the present purposes, it is sufficient to note that the plotter includes a table 26 providing an upwardly facing surface 28 over which the cutter head 20 is moved. The surface 28 supports the sheet material 22 and is preferably made from rubber or other similar resilient material which is sufficiently resilient to allow the cutting edge of the cutter tool, as hereinafter described in more detail, to be pressed a slight distance into the surface 28 without cutting it. The sheet material 22 may be held to the surface 28 in various different ways, but preferably the plotter includes a vacuum hold down consisting of a plurality of tiny openings 30, 30 distributed over the entire extent of the surface 28 and communicating with a suitable source of vacuum (not shown). The vacuum produced on the underside of the sheet material 22 by these openings holds the sheet material 22, and the article cut therefrom, in place relative to the supporting surface 28. A carriage 32 is supported for movement relative to the table 26 in the direction of the X axis shown in FIG. 1 and on the carriage 32 is a part, to which the cutter head 20 is attached, which is movable relative to the carriage in the Y direction of FIG. 1. Therefore, it will be understood that by moving the carriage 32 relative to the table and by moving the cutter head 20 relative to the carriage 32 the cutter head may be moved to any point on the sheet material 22. The actual construction of the table 26, the carriage 32 and the means for supporting the carriage relative to the table may vary widely. A suitable construction of these parts is, however, shown in copending patent application Ser. No. 228,289 of Gerber and Logan, filed Oct. 4, 1962 and entitled "X-Y PLOTTER." Reference may be had to this copending application for further details of the construction.

Included in the cutting device of FIG. 1 is a computer, or similar controller indicated generally at 34 for controlling the movement of the cutter head 20 along the line to be cut, the rotation of the cutting tool, and the shifting of the cutter head between a cutting condition and a noncutting condition. The computer 34 may take any one of various different forms well known in the art and operates to generate suitable command signals transmitted to the cutter head and the driving motors of the plotter. In the illustrated case, the computer 34 is shown to have an input device in the form of a magnetic tape transport mechanism 36 which handles a magnetic tape having recorded thereon coded information utilized by the computer to derive the command signals. It should be understood, however, that this type of input has been shown for purposes of illustration and that any other type of input well known in the art could also be used.

Figure 2:
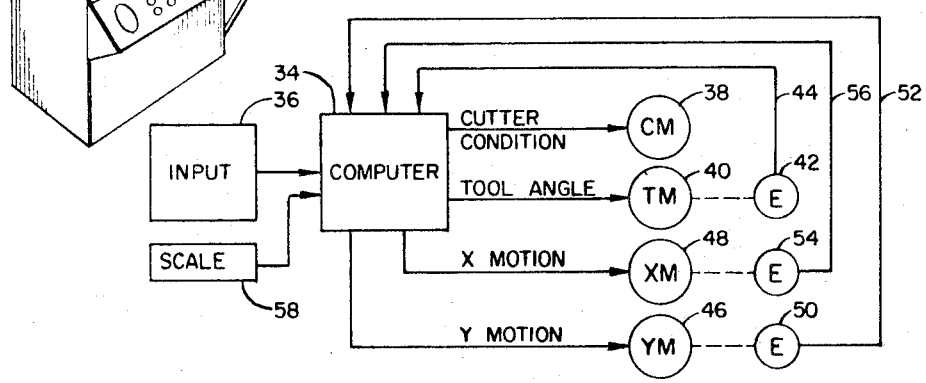
FIG. 2 is a schematic diagram of the control system of the FIG. 1 device.

FIG. 2 is a schematic block diagram showing the basic control mechanism for the FIG. 1 device. Referring to this FIG., the reference numeral 38 indicates a motor associated with the cutter head 20 and operable to shift the cutter head between its cutting and noncutting condition. In the illustrated cutter head, as described in more detail hereinafter, this motor is a rotary solenoid which is energized to shift the cutter head to a noncutting condition and deenergized to shift the cutter head to a cutting condition. The reference numeral 40 indicates a motor for rotating the tool about its central axis to change the angle of its cutting edge, or cutting axis, relative to the sheet material. In the illustrated cutter head, this motor is a stepping motor and the command signals transmitted thereto consist of pulses which step the motor. Associated with the motor 40 is an encoder 42 which, through the line 44, supplies the computer 34 with a signal indicating the angular position of the tool. This encoder may take various different forms, but in the illustrated cutter head it consists merely of a switch which is operated at one specific angular position, referred to as the zero position, of the tool. The computer 34, in turn, includes a register (not shown) containing a number representative of the tool angle. Each time the tool passes its zero position, the encoder 42 transmits a signal to the computer and the computer thereupon checks the number in the tool angle register. If this number is not representative of the zero position, a suitable correction is made to make it so.

The reference numerals 46 and 48 in FIG. 2 represent, respectively, motors for driving the carriage 32 in the X direction and the part of the carriage to which the cutter head 20 is attached in the Y direction. These motors may also take various different forms, but preferably are stepping motors with the command signals supplied thereto consisting of trains of pulses. In moving the cutter head 20 along a line not parallel to either the X or the Y axis, pulses are supplied to both of the motors 46 and 48 simultaneously with the ratio of the pulse repetition rates of the two trains of pulses being related to the slope of the line. Associated with the Y axis motor 46 is an encoder 50 which, through the line 52, supplies the computer 34 with information as to the actual position of the carriage 32 along the Y axis. Similarly, an encoder 54 is connected with the X axis motor 48 and supplies the computer 34 with information, through the line 56, as to the actual position of the cutter head 20 along the X axis. In the preferred form of the computer 34, the input information recorded on the magnetic tape or other record medium used by the input device 36 consists of coded information defining the coordinates of a number of end points between which the cutter head 20 is to be moved in sequence, the line followed by the cutter 20, therefore, usually consisting of a large number of line increments each extending between two such points. At the start of any one line increment the computer 34 receives information from the input device 36 as to the coordinates of the next end point. These desired end point coordinates are then compared with the coordinates of the present position of the cutter head 20, as provided by the encoders 50 and 54, and the results of the comparisons are used by the computer to generate two trains of pulses transmitted respectively to the Y motor 46 and X motor 48. The number of pulses supplied to the X motor are sufficient to move the carriage 32 along the table 26 a distance equal to the X component of the desired movement and the number of pulses supplied to the Y motor 48 are sufficient to move the cutter 20 along the carriage 32 a distance equal to the Y component of the desired movement. At the beginning of the line increment, pulses are also supplied to the tool rotating motor 40 to bring the cutting edge of the tool into alignment with the incremental line to be followed. The encoders are not however always essential and they may in some instances be eliminated and the control system operated as an open loop system rather than a closed loop system as illustrated. Also, the drive need not necessarily be by means of stepping motors and other conventional drive means such as a servomotor system could be used in place of the stepping motors, the stepping motors however being the presently preferred form of drive.

The pulses transmitted to the tool rotating motor 40 may be generated from information prerecorded on the record medium of the input device 36 along with the end point coordinates, or the computer 34 may itself compute the required tool angle from the end point information and use this computation to generate the necessary pulses for the motor 40. The information for controlling the cutter condition is preferably prerecorded on the record medium used by the input device 36 and is used by the computer 34 to produce proper energizing or deenergizing signals transmitted to the motor 38. As shown in FIG. 2, the computer 34 also preferably has associated therewith a unit 58 for controlling the scale of the shape cut by the cutter head in response to a given input program. This unit basically operates on the output signals to the X and Y motors 48 and 46 and multiplies said output signals by a selected proportionality or scale factor. By setting the scale unit 58 to provide one scale factor the input program on the record used by the input device may be used to produce one size of end product, and by setting a different scale factor on the scale unit the same program may be used to produce a different size of end product.

Figure 3:
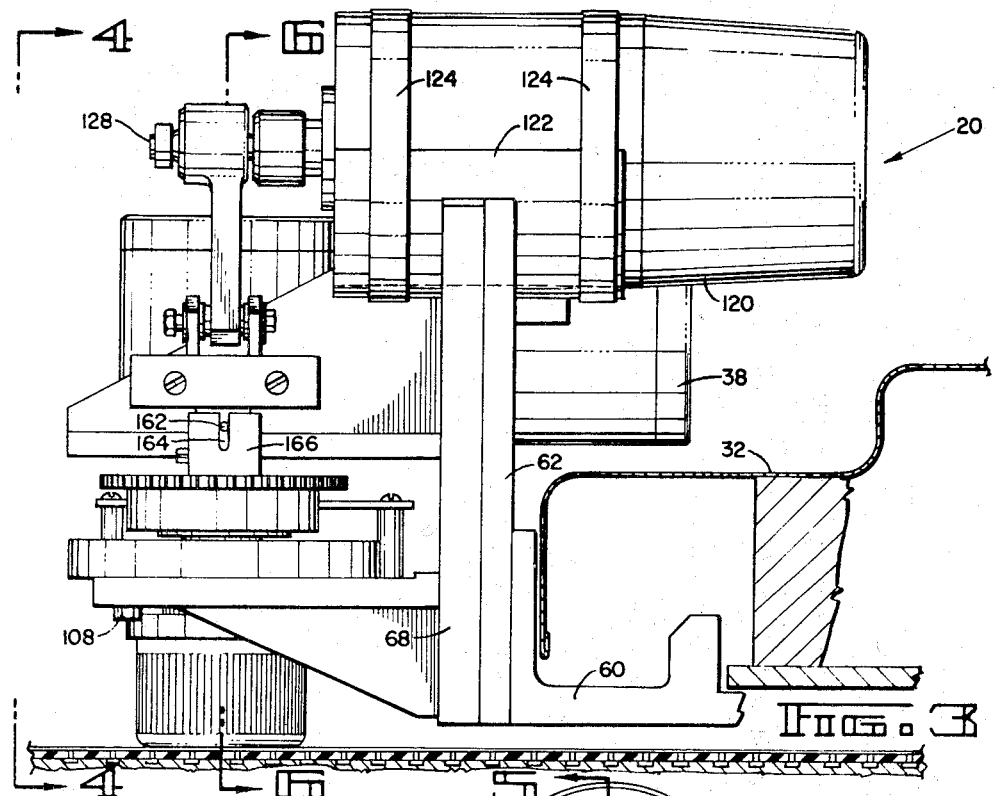
FIG. 3 is a side elevational view of the cutter head of the device of FIG. 1.
Figure 4:
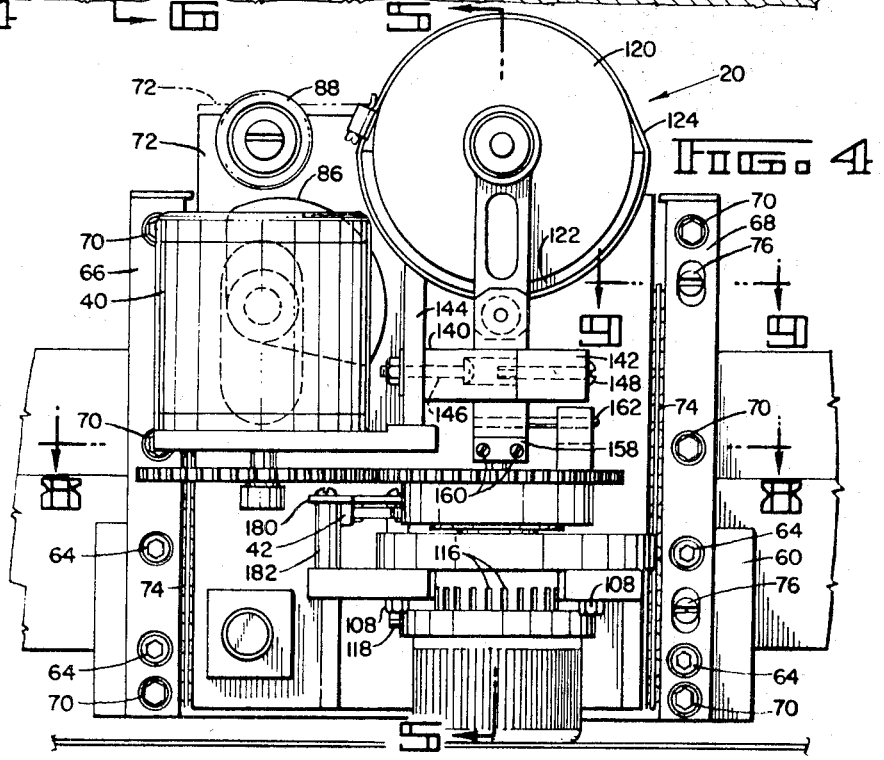
FIG. 4 is a front elevational view of the cutter head of the device of FIG. 1 taken on the line 4—4 of FIG. 3.
Figure 9:
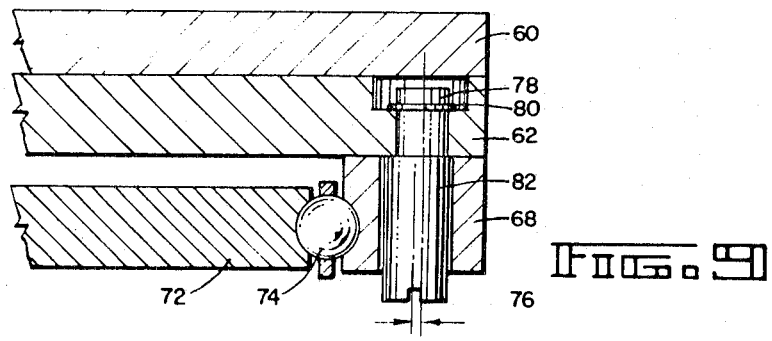
FIG. 9 is a fragmentary horizontal sectional view taken on the line 9—9 of FIG. 4 and drawn on a scale still further enlarged from that of FIG. 8.

Turning now to FIGS. 3 to 12, these FIGS. show in more detail the actual construction of the cutter head 20 of FIG. 1. Referring first to FIGS. 3 and 4, the part of the plotter carriage 32 which is movable in the Y direction of FIG. 1, and to which the cutter head 20 is attached, is indicated at 60. The cutter head itself includes a first frame fixed to the carriage part 60 and a second frame movable vertically relative to the first frame. The first frame comprises a plate 62 which is attached to the part 60 by four screws 64,64. On either side of the plate 62, as shown in FIG. 4, are two vertical guide rails 66 and 68, respectively, attached to the plate 62 by screws 70, 70. The two vertical guide rails 66 and 68 receive therebetween a plate 72 comprising part of the second or movable frame of the cutter head. The plate 72 is guided for vertical movement relative to the guide rails 66 and 68 by two linear ball bearing assemblies 74, 74 each interposed between a respective one of the guide rails and the plate 72. The nature of the connection between the carriage part 60 and the two frames of the cutter head is further illustrated in FIGS. 8 and 9. Referring to these FIGS., it will be noted that the screws 70,70 which pass through the rail 68 are received in openings in the rail 68 which are substantially larger than the shank of the screw so as to allow the rail 68 to be moved slightly toward or away from the opposite rail 66 to adjust the load on the bearing assemblies 74,74 and to take up any looseness between the movable frame plate 72 and the fixed frame plate 62. Movement of the rail 68 toward or away from the opposite rail 66 is effected by means of two eccentric heads 76,76 associated with the rail 68. As shown in FIG. 9, each eccentric head 76 includes an inner cylindrical stem 78 which is rotatably connected with the fixed frame plate 62 by a retainer 80. Integral with the stem portion 78 is a cylindrical head portion 82 whose axis is displaced eccentrically from the axis of the stem portion 78, the head portion 82 being slotted, as shown, to receive the head of a screw driver for rotation. It will, therefore, be understood that as the eccentric head is rotated, the head portion 82 will bear against the surface of the opening in the rail in which it is received and, depending on the direction of its rotation, will move the rail 68 toward or away from the opposite rail 66. It will, of course, be understood that during such adjustment of the rail 68, the other screws 70,70 fixing the rail 68 to the plate 62 are loosened, and that after such adjustment is made the screws 70,70 are tightened to hold the rail in its adjusted position.

Figure 7:
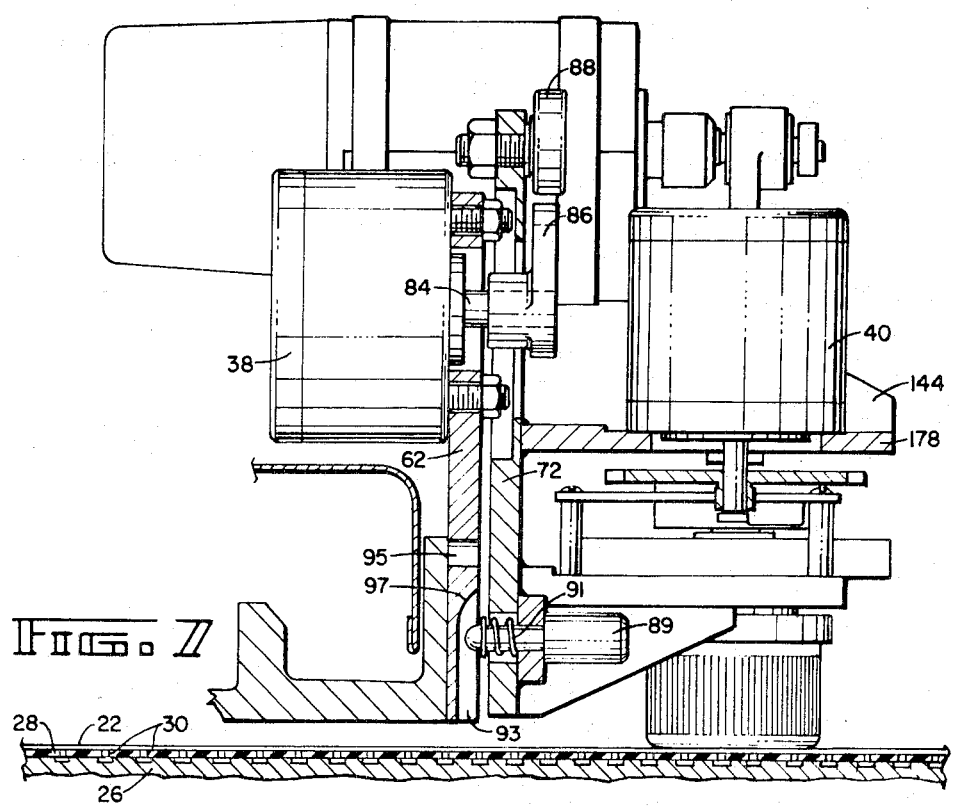
FIG. 7 is a vertical sectional view taken on the line 7—7 of FIG. 6.
Figure 8:
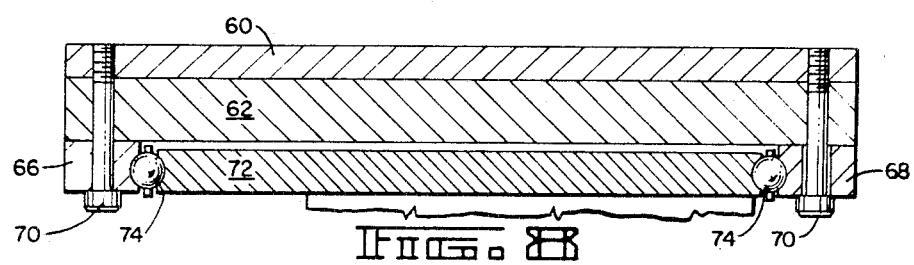
FIG. 8 is a fragmentary horizontal sectional view taken on the line 8—8 of FIG. 4, this FIG. being drawn on an enlarged scale from that of FIG. 4.

The movable frame is moved relative to the fixed frame by a rotary solenoid 38 mounted on the fixed frame plate 62, as best shown in FIG. 7. The body of the solenoid 38 is located to the rear of the plate 72, or to the left as shown in FIG. 7, and included in the solenoid is an operating shaft 84 which extends forwardly through openings in the plate 62 and the plate 72 and has a lifting cam 86 fixed to its forward end. The cam 86 cooperates with a roller 88 carried by the movable frame plate 72 for rotation about an axis normal to said plate. The shape of the cam 86 is shown in FIGS. 4 and 6. These FIGS. show the cutting head in its cutting condition, in which condition the cam 86 is out of engagement with the roller 88 and the movable frame is held in a lowered condition by gravity. To shift the cutter head to a noncutting condition, the movable frame is raised from the lowered condition shown in FIGS. 4 and 6, this being accomplished by energizing the solenoid 38 which rotates the cam 86 approximately 90° counterclockwise form the position shown in FIGS. 4 and 6, causing the cam to engage the roller 88 and lift the frame 72 to the position shown by the broken lines in FIG. 4. In this position of the frame 72 the cutting tool is raised above the surface of the material to be cut and is thereby prevented from engaging and cutting the material.

In addition to raising the movable frame by means of the lifting solenoid 38 and cam 86, it may also be manually raised and locked in an elevated position. To provide for locking in an elevated position, the movable frame plate 72 as best shown in FIG. 7, includes a locking plunger 89 slidably supported thereby and biased rearwardly to the position shown in FIG. 7 by a helical spring 91. The rear end of the plunger 89 normally rides in a vertical slot 93 formed in the rear plate 62. Above the groove 93, however, is an opening 95 into which the rear end of the plunger 89 may be placed to hold the movable frame in an elevated position. The upper end of the groove 93 is preferably curved, as shown at 97, so that as the movable frame is raised by hand the curved upper portion 97 of the groove cams the plunger 89 forwardly and out of the groove. Thereafter when the plunger is brought into registration with the opening 95 the spring 91 moves it rearwardly into the opening 95 to lock the movable frame in the corresponding elevated position. When it is desired to return the movable frame to its normal position, the forward end of the plunger 89 may be grasped by hand and pulled forwardly to remove its rear end from locking relationship with the opening 95.

Referring to FIGS. 5 and 6, the cutting tool of the cutter head 20 is shown at 90 and consists of an elongated cylindrical element provided with a flat 92 at its upper end for cooperation with a chuck, hereinafter described, and shaped at its lower end to provide a sharp straight cutting edge 94. The cutting edge 94 may be formed in various different ways on the cutting tool 90, but preferably it is formed by shaping the tool as shown in detail in FIGS. 11 and 12. Referring to these FIGS., it will be noted that the cutting edge 94 is normal to the central axis of the tool 90 and is formed by the intersection of two diametrically opposed forwardly converging flats 96,96. At each end of the cutting edge 94 are two other sharp side edges 98,98 each intersecting the associated end of the cutting edge and both located in a plane containing the cutting edge 94 and the central axis of the tool. The two side edges 98,98 diverge outwardly from the central axis in passing upwardly from the cutting edge 94 and each edge 98 is formed by two flat surfaces 100,100 which intersect to form the edge, the angle between the two surfaces 100,100 being preferably at an acute angle to each other as measured through the body of the tool. The cutting edge 94 is also formed at a known angle to the flat 92, and in the illustrated case, as shown in FIGS. 5 and 6, it is arranged generally parallel to the flat 92.

The cutting tool 90 is supported for reciprocating movement along its central axis, which axis is in turn arranged generally normal to the sheet of material 22 to be cut. As shown by FIGS. 5 and 6, the cutting tool 90 is supported for reciprocation along, and for rotation about its central axis by two vertically spaced bushings 102,102, which are preferably of the antifriction variety including ball bearing elements, retained in an annular guide member 104, the guide member 104 is fixed to a bracket 106 forming part of the movable frame by a number of screws 108,108 passing upwardly through the bracket 106 and threaded into the guide member 104.

Below the bracket 106, the guide member 104 is externally threaded to receive a presser member 110 having a flat downwardly directed face 112 adapted to engage and rest on the sheet of material to be cut during the cutting operation. The presser member 110 includes a central aperture 114 through which the cutting tool 90 moves during its reciprocation. During each cycle of tool reciprocation, the cutting edge 94 is located above the presser face 112 for a portion of the cycle and is located below the face 112 for the remainder of the cycle. The maximum amount by which the edge extends below the surface 112 during a cycle determines the thickness of material which may be cut, and by threading the presser member 112 in one direction or the other relative to the guide member 104, the maximum penetration of the cutting tool may be selectively varied. Therefore, for any thickness of sheet material, the penetration of the cutting tool may be set so as to completely pierce the sheet material during each stroke without moving any substantial extent into the surface 28 on which the sheet material is supported. Also, movement of the presser member 110 on the guide member 104 allows an adjustment to accommodate tools of slightly varying lengths. As shown in FIGS. 4 and 6, a detent means is provided for holding the presser member in a selected angular position relative to the guide member, said detent means comprising a series of vertical grooves 116,116 on the outer surface of the guide member 104 and a cooperating spring biased ball plunger detent unit 118 fixed to the presser member 110.

The cutting tool 90 is reciprocated by a motor 120 fixed to the movable frame plate 72. In the illustrated case, the saddle-shaped member 122 is welded to the plate 72 and receives the motor 120, and two band clamps 124,124 surround the motor and the saddle member 122 and hold the motor tightly in place on the saddle member. The motor 120 includes a drive shaft 126 having an eccentric crank 128 on the outer end thereof. Rotatably connected with the crank 128, by means of two ball bearing units 130,130, as shown in FIG. 5, is a connecting rod 132 rotatably connected at its other end with a part 134 by two ball bearing units 136,136 and a connecting pin 138. The part 134 is guided for vertical reciprocative movement by a bushing fixed relative to the movable frame and comprised of two nylon blocks 140 and 142. The block 140 is fixed to a wall 144, forming part of the movable frame, by two bolts 146,146, as shown best in FIGS. 4 and 5. The heads of the bolts 146,146 are located in enlarged openings passing partly through the block 140, and the bolts have nuts threaded on their free ends. The block 140 partially surrounds the reciprocating part 134. The block 142 is in turn fixed to the block 140 by two screws 148,148 which pass through the block 142 and threadably engage the block 140. The block 142 surrounds the remainder of the part 134, and the two blocks 140 and 142 together provide a guide opening for the part 134. By removing the two screws 148,148, the nylon block 142 is removable from the block 140, and when the block 142 is so removed the part 134 may be swung out of its normal position to permit replacement of the cutting tool 90, as hereinafter described in more detail.

As shown best in FIG. 5, the reciprocating part 134 is connected with a chuck for gripping the cutting tool 90, the chuck including a main body 150 having an upwardly extending stem 152 rotatably supported by a bushing 154, fixed to the part 134, for rotation about the axis of reciprocation which is coincident with the central axis of the tool 90. The chuck body 150 is held vertically in place relative to the part 134 by a collar 156 fixed to the upper end of the stem 152 by a set screw. Associated with the chuck body 150 is a clamping block 158 which is fixed to the chuck body by two screws 160,160. The upper end of the tool 90 is held in the chuck by being clamped between the main body 150 and the clamping block 158, as shown in FIG. 5. To remove the cutting tool 90 from the cutter head, the clamping block 158 is first removed from the chuck by removing the screws 160,160, and the nylon guide block 142 is then removed by removing the screws 148,148. The reciprocating part 134 and the chuck body 150 may thereupon be swung to an out of the way position by rotating the crank 132 about the eccentric shaft portion 128. The cutting tool 90 may then be lifted from the guide member 104. In replacing the tool in the cutter head, the reverse procedure is followed.

From the foregoing description of the reciprocating part 134 and the associated chuck, it will be understood that the chuck may be rotated relative to the part 134, to accordingly rotate the tool about its central axis, while the tool is reciprocating. Means for so rotating the chuck relative to the reciprocating part 134 includes a laterally extending pin 162 fixed to the chuck body 150 and having an outer end received in a vertically extending slot 164 formed in a guide block 166 preferably made of nylon. The guide block 166 is carried by an annular member 168 rotatably supported on the guide member 104, by a ball bearing unit 170, for rotation about the central tool axis. Fixed to the annular member is a gear 172 which meshes with another gear 174 fixed to the output shaft 176 of the drive motor 40 supported by a bracket 178 forming part of the movable frame. The motor 40 is preferably a stepping motor, as hereinbefore described in connection with FIG. 2, and it will be understood that operation of this motor, through the gears 174 and 172, causes rotation of the annular member 168 and the guide block 166 fixed thereto. As the guide block 166 rotates, it moves with it the pin 162 which in turn rotates the chuck and the cutting tool.

Figure 10:
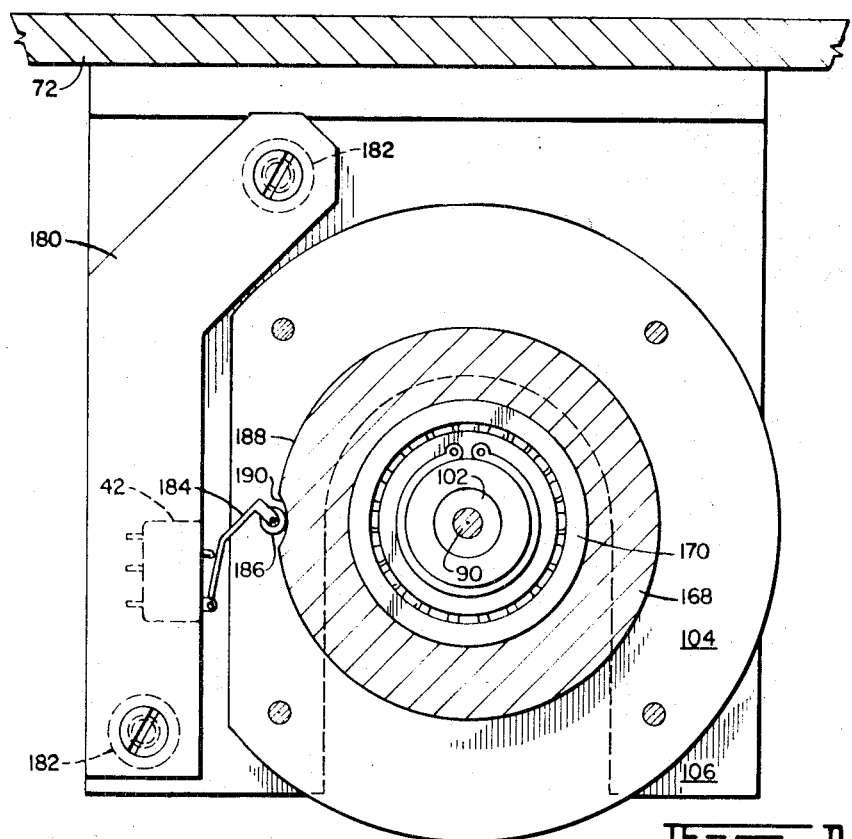
FIG. 10 is a horizontal sectional view taken on the line 10—10 of FIG. 6.
Figure 11:
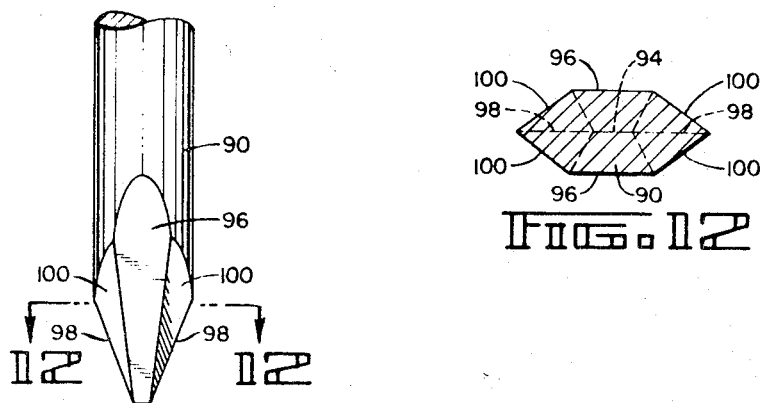
FIG. 11 is an enlarged elevational view of the cutting end of the cutting tool of the device of FIG. 1
Figure 12:
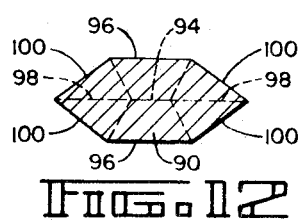
FIG. 12 is a transverse sectional view through the cutting tool taken on the line 12—12 of FIG. 11.

As mentioned previously in connection with the description of the control system of FIG. 2, the tool rotating motor 40 has associated therewith a means for providing a signal representative of the tool angle and, referring to FIGS. 4 and 10, this means comprises a switch 42 carried by a supporting plate 180 spaced above the bracket 106 by two supporting posts 182,182. The switch 42 is located adjacent the annular member 168 and includes an actuating arm 184 having a roller 186 on its outer end. The roller 186 rides against the side surface 188 of the annular member 168, and included in this surface, at one point on the circumference thereof, is a recess 190. The switch 42 has two states of actuation, one state being reached when the roller 46 is in engagement with the recess 190, as shown in FIG. 10, and the other state being reached when the roller engages the surface 188 on either side of the recess 190. Therefore, each time the recess 190 is brought into registration with the switch roller 186, the switch 42 produces a signal indicating this particular angular position of the annular member 168 and allows the number in the tool angle register of the computer 34 to be checked and corrected if necessary.

We claim:
1. A cutter head for use in cutting sheet material, said cutter head comprising: a frame, a reciprocating part supported for reciprocative movement along an axis of reciprocation fixed relative to said frame, means on said frame for reciprocating said reciprocating part along said reciprocating axis between two points on said axis, a chuck adapted to grip an elongated cutting tool with its central axis generally coincident with said axis of reciprocation, means connecting said chuck to said reciprocating part permitting rotation of said chuck relative to said reciprocating part about said axis of reciprocation and restraining movement of said chuck relative to said reciprocating part along said axis of reciprocation, a guide member on said frame surrounding said axis of reciprocation and adapted to engage a tool received in said chuck and to support such a tool for reciprocation along and rotation about said axis of reciprocation, a presser member on said frame having a surface generally perpendicular to said axis of reciprocation and adapted engage the surface of the material to be cut to limit movement of said cutter head toward said material, and means for adjustably moving said presser member to different positions along said axis of reciprocation to vary the amount by which a cutter tool gripped in said chuck moves beyond said presser member surface during each stroke of its reciprocation.

2. A cutter head as defined in claim 1 further characterized by said presser member being threadably received on said guide member and having an opening in said face through which a tool gripped in said chuck moves during its reciprocation.

3. A cutter head as defined in claim 1 further characterized by means for rotating said chuck relative to said frame while said chuck is reciprocated by said reciprocating part.

4. A cutter head as defined in claim 3 further characterized by said means for rotating said chuck comprising a part supported on said frame for rotation about said axis of reciprocation and including means defining a slot extending generally parallel to said axis of reciprocation, and a laterally extending arm on said chuck received in said slot for moving said chuck about said axis of reciprocation in response to movement of said slot providing part about said axis of reciprocation.